Aug. 16, 1932.  W. L. BADGER  1,872,554
ENTRAINMENT SEPARATOR
Filed Jan. 14, 1929
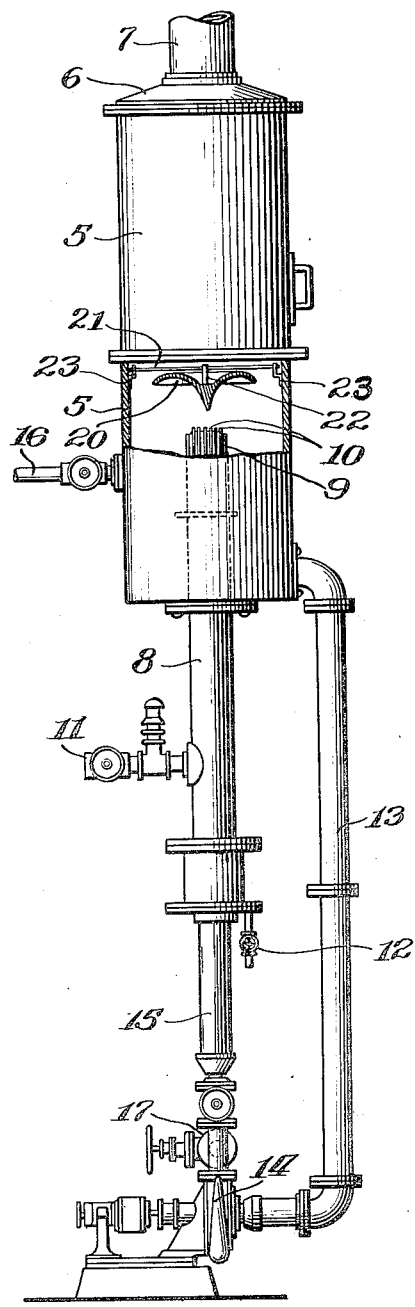
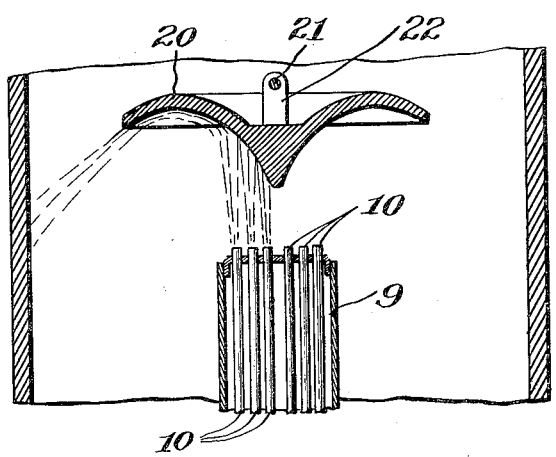

Patented Aug. 16, 1932

1,872,554

UNITED STATES PATENT OFFICE

WALTER L. BADGER, OF ANN ARBOR, MICHIGAN, ASSIGNOR TO SWENSON EVAPORATOR COMPANY, OF HARVEY, ILLINOIS, A CORPORATION OF ILLINOIS

ENTRAINMENT SEPARATOR

Application filed January 14, 1929. Serial No. 332,363.

My invention relates to entrainment separators,—that is separators adapted to separate entrained particles of liquid from ascending vapors.

It has particular utility in and will be illustrated and described with reference to a boiler particularly adapted for evaporating and distilling processes.

When any liquid is boiled the bubbles of vapor bursting at its surface throw off particles or drops of the liquid that are projected to a greater or lesser distance upwardly into the vapor space and more or less of the liquid may be entrained and carried along by the vapor. The height to which these particles or drops are projected is a function of the viscosity and surface tension of the liquid and of the violence with which the liquid is boiled. When there is a relatively large surface for the disengagement of the vapor bubbles, or the boiling is gentle, or the liquid is very viscous, then the amount of this entrainment may be negligible. But if the liquid is confined so that the amount of vapor liberated per unit of liquid surface is large or if the liquid circulates rapidly or is not very viscous the amount of entrainment is greater. And such entrainment, even in relatively small amounts is sometimes undesirable. Thus, for example, the drops of liquid may contain some of the constituents of the liquid that the vapors should not contain,—in fact that the boiling is particularly designed to eliminate. Such a situation would obtain most frequently in distilling processes where the primary if not sole object is to rid a liquid of its less volatile impurities,—for example, the distilling of water. Or it may be that the materials so entrained and which might be lost thereby are sufficiently valuable that their escape is an important economic loss,—a situation most frequently met in mere evaporation or concentration work.

The difficulties incident to liquid entrainment have been found to be more pronounced in a type of boiler or evaporator that recently has been developed and become popular, viz., a vertical tube high speed evaporator. Briefly, this type of evaporator or boiler comprises a body for holding the liquid to be boiled and into which a vertical tubular heater projects. The liquid to be boiled is removed from the evaporator body and pumped at high velocity upwardly through the tubes of the heater back into the body, the heating medium passing through the heater around the tubes. Particularly in this type of boiler or evaporator a mixture of vapor and liquid particles is likely to be, and, usually is, projected violently from the upper ends of the tubes into the vapor space above the liquid in the body. The velocity at which this mixture is projected from the tubes is greater as the rate of boiling is greater. The rate of boiling is affected by both the heat transfer coefficient and the working temperature drop and therefore is relatively great in these boilers that are usually equipped with long small diameter heater tubes and so proportioned and operated as to afford very high heat transfer coefficients.

When fine drops of liquid fall through a still body of gas or vapor, the acceleration due to the force of gravity tends to increase their velocity while friction between the drops and the gas tends to decrease their velocity. This friction increases as the velocity of the drops increases until, at some point, the two effects will equalize and, from that point on, the drops will fall at a constant velocity. This is known as the terminal velocity of fall. The magnitude of this velocity is given by Stokes' equation, which is $$V = \frac{2R^2(S-S')G}{9N}$$

In this equation V is the terminal velocity of fall, R is the radius of the drop or particle, S is the specific gravity of the liquid of which the particle is composed, S' is the specific gravity of the medium through which the drop is falling, G is the acceleration of gravity and N is the absolute viscosity of the medium through which the drop is falling. Obviously if the drop is falling through a rising stream of gas or vapor instead of through a still body of gas or vapor, any drop whose terminal velocity of fall is equal to or less than the velocity of the rising stream of gas or vapor will be carried off or entrained in the vapor and cannot be removed by lengthening the height of the vapor space above the body of boiling liquid.

The drops which are projected upwardly from bursting bubbles at the surface of a boiling liquid vary in size and are projected at different velocities. If their velocity is greater than the velocity of the rising stream of gas or vapor, they will ascend at a decreasing velocity, finally reach zero velocity, and then fall back through the vapor. If they are small enough so that their terminal velocity of fall is less than the velocity of the rising current of vapor they will be carried along with the vapor; while if their terminal velocity of fall is greater than the velocity of the rising current of vapor they will tend to fall back toward the surface of the liquid. The height to which they will be projected before they fall back depends upon the radius of the drops and the velocity with which they are ejected from the surface of the liquid. If the height of the vapor space is limited they may not reach their point of zero velocity before they are carried out in the vapor pipe with the rising current of vapor, even though their terminal velocity of fall may be greater than the velocity of the rising column of vapor.

Thus as the tubes of these high speed vertical tube evaporators are made longer and of smaller diameter, the velocity of the liquid-vapor mixture is increased and the tendency for liquid entrainment becomes greater,—in fact the velocity at which the liquid-vapor mixture leaves the tubes may be so great that, within any reasonable space above the discharge ends of the tubes, none of the drops or particles could ever fall back and all of the liquid might be carried off in the vapor pipe in the form of entrainment.

One of the objects of my invention is to provide an improved entrainment separator.

Another object is to provide a separator that will permit evaporation to be carried on at high rates without excessive entrainment losses.

Another object is to provide a separator that will permit evaporation to be carried reliable.

Another object is to provide an entrainment separator particularly adapted for vertical tube high speed boilers or evaporators.

Other objects and advantages will hereinafter appear.

For purposes of explanation an embodiment of the invention incorporated in a vertical tube force feed high speed evaporator is illustrated in the accompanying drawing, although the invention is applicable to other types of evaporators wherein the liquid is projected upwardly into the vapor space.

Fig. 1 is a general elevational and partial sectional view of a complete evaporator or boiler equipped with an entrainment separator, and Fig. 2 is an enlarged vertical cross section through a portion of the body of the boiler showing the construction of the separator more in detail.

In order to impart a better understanding of the separator and its operation I will first briefly describe the illustrated forced circulation high speed vertical tube evaporator or boiler with which it has been incorporated. This boiler has a cylindrical metal body 5 having a suitable cover 6 and vapor outlet 7 at its upper end. This vapor outlet is for the discharge of vapors driven off during the boiling process and for the application of whatever vacuum may be necessary or desirable in the treatment of particular liquids. It may connect with any desired equipment, such as a condenser, waste pipe, or other evaporators, depending upon the requirements of the process to be carried on and to a vacuum pump or other suitable vacuum producing apparatus for creating the proper degree of reduced pressure within the body of the boiler.

A heating element 8, comprising in general a long tubular shell 9 and a series of long slender tubes 10 extending therethrough, projects through the bottom and into the interior of body 5. The ends of shell 9 are tightly closed by the tube sheets through which tubes 10 extend so that a suitable fluid heating medium, such as steam, may circulate outside of and in heat exchanging relation with the tubes. The steam may enter the heater through a steam inlet 11 and the condensate removed through an outlet 12. A liquid circulation pipe 13 taps the lower end of body 5 and leads to a circulation pump 14—the pump being driven by suitable means such as a direct connected motor or a belt. A valved inlet pipe 15 leads from the discharge of the pump to the lower end of heating element 8 in communication with the tubes thereof.

In operation, the liquid to be boiled is withdrawn from body 5 through pipe 13 and is forced by pump 14 upwardly through pipe 15 into the lower ends of the heater tubes. Heat is imparted at a high rate to the liquid circulating through the heater tubes and vigorous boiling, with a resultant violent ejection of a liquid-vapor mixture from the upper end of the tubes into the vapor space thereabove, takes place. Fresh liquid to be boiled may be added through a valved supply pipe 16 and concentrated liquid may be withdrawn, if desired, through a valved discharge pipe 17.

Above the tubes in the vapor space of the boiler body I place a generally bell-shaped metal deflector or hood 20. This deflector or separator may be supported in the proper position above the end of the heater in any appropriate manner, such, for example, as a bar 21 that passes through a hole in a lug 22 of the deflector. The ends of bar 21 are held in angle bar clips 23 that are riveted, bolted, welded or otherwise attached to the inside of the body wall. The deflecter may be a casting or it may be formed from sheet metal.

This hood or deflector has a contacting surface, against which the vapor and entrained liquid impinge, that curves gradually and continuously backwardly and outwardly in all directions from a forwardly projecting central apex and then merges into a forwardly and outwardly flaring rim. Preferably the annular edge or rim of deflector 20 is turned downwardly and outwardly so that liquid leaving its under surface will travel downwardly and toward the wall of the body. The under side or contacting surface of the hood is so shaped and positioned with reference to the location of the heater tubes that liquid projected from those tubes will always strike a rising surface. Thus, the rising streams of liquid drops or particles and entraining vapors projected violently from the upper ends of the tubes tend and are forced to flow outwardly along the under flaring surface of the bell-shaped deflector. Generally speaking, the drops flow next to the surface so that they in effect form a film or sheet of liquid that travels rapidly on the under surface of the deflector and are projected at high velocity from and leave the outer lip thereof as a solid sheet or liquid curtain. The best results ordinarily will be attained by so proportioning, shaping and positioning the deflector relative to the tubes and the wall of the boiler body that this downwardly and outwardly directed solid liquid sheet or curtain will completely bridge the gap between the rim of the separator and the wall of the body.

In operation the steam produced by the boiling of the liquid being treated is liberated partly in the tubes and partly immediately after the liquid leaves the tubes, but it is all liberated under the deflector and the curtain of liquid projected from its outer rim. Thus all of the vapor drawn out through vapor outlet 7 must pass through this liquid curtain which serves as an exceedingly effective screen or "scrubber" for removing all liquid particles therefrom. Consequently the vapor that has reached the vapor outlet, after passing through the liquid curtain is practically free of entrained liquid.

In order that the liquid film or stream leaving the rim of the deflector may have the highest possible velocity, it is necessary that all factors which might dissipate any of the energy it contains as it issues from the tubes be held to a minimum. Thus the slope of the deflector should be smooth and so arranged that all of the heater tubes including the outermost row project their liquid against a surface having a rising slope. The under or effective surface of the deflector should be shaped in smooth easy curves to transform with a minimum of turbulence the velocity of the liquid from an upward one along its inner surface to a downward and outward one from the outer edge thereof. Consideration also should be given to the position of the deflector, the velocity, direction and momentum of the liquid curtain and the degree of vacuum to which the vapors are subjected. The velocity of the escaping vapor acting upwardly upon the liquid curtain, of course, tends to deflect it, and particularly its outer edge, upwardly, consequently there is a tendency for the curtain to be lifted, particularly adjacent the body wall, and if this tendency is strong enough a gap may result between the curtain and the body wall through which vapor may pass without being subject to the screening or scrubbing action heretofore mentioned. Of course, where entrainment is to be kept at a minimum, care should be taken that the curtain always strikes the body of the boiler to preclude the possibility that any vapor can escape without having to pass through the curtain.

Although the invention has been specifically illustrated and described with reference to an evaporation or distillation boiler, it is to be understood that it is not limited to such an environment but may be utilized in connection with other apparatus wherein entrainment of liquid in ascending vapors is to be prevented or limited.

Having thus illustrated and described the nature and one embodiment of my invention, what I claim and desire to secure by Letters Patent of the United States is as follows:

1. The method of separating entrained liquid from a column of liquid-vapor rising at high velocity comprising the conversion of the entrained liquid particles into a substantially solid sheet of liquid bridging the space through which the vapor must pass.

2. The method of separating entrained liquid from the rising liquid-vapor column in a vertical tube evaporator, which includes projecting at high velocity the liquid-vapor column vertically against a deflector, and diffusing at high velocity the liquid particles from the deflector into a substantially solid sheet of rapidly moving liquid extending transversely and entirely across the space through which the vapor must pass in its escape from the evaporator.

In witness whereof I hereunto subscribe my name this 9th day of January, 1929.

WALTER L. BADGER.

CERTIFICATE OF CORRECTION.

Patent No. 1,872,554.  August 16, 1932.

WALTER L. BADGER.

It is hereby certified that error appears in the printed specification of the above numbered patent requiring correction as follows: Page 2, lines 49 and 50, strike out the words "a separator that will permit evaporation to be carried" and insert instead an entrainment separator that is effective, simple and; and that the said Letters Patent should be read with this correction therein that the same may conform to the record of the case in the Patent Office.

Signed and sealed this 22nd day of November, A. D. 1932.

M. J. Moore,
Acting Commissioner of Patents.

(Seal)